United States Patent
Maton

(10) Patent No.: US 6,725,271 B1
(45) Date of Patent: Apr. 20, 2004

(54) METHOD AND DEVICES FOR MANAGING DATA TRANSFER

(76) Inventor: Gilles Maton, 2, rue Amelot, 75011 Paris (FR)

( * ) Notice: Subject to any disclaimer, the term of this patent is extended or adjusted under 35 U.S.C. 154(b) by 0 days.

(21) Appl. No.: 09/463,969

(22) PCT Filed: Aug. 3, 1998

(86) PCT No.: PCT/FR98/01729

§ 371 (c)(1),
(2), (4) Date: Apr. 20, 2000

(87) PCT Pub. No.: WO99/08428

PCT Pub. Date: Feb. 18, 1999

(30) Foreign Application Priority Data

Aug. 12, 1997 (FR) .............................. 97 10281

(51) Int. Cl.⁷ ............................................. G06F 15/16
(52) U.S. Cl. ..................................... 709/229; 709/225
(58) Field of Search ................................ 713/201, 191; 717/169–173; 709/225, 229

(56) References Cited

U.S. PATENT DOCUMENTS 3,609,697 A * 9/1971 Blevins et al. ................ 705/56
6,259,675 B1 * 7/2001 Honda ......................... 370/248

FOREIGN PATENT DOCUMENTS

| EP | 715247 A  | * | 5/1996  | ............. G06F/1/00 |
| EP | 778513 A2 | * | 6/1997  | ............. G06F/1/00 |
| EP | 778512 A  | * | 11/1997 | ............ G06F/01/00 |

OTHER PUBLICATIONS

Tanenbaum A S, "Computer Networks, Passage," 1981, pp. 636–641.*

* cited by examiner

*Primary Examiner*—Kristine Kincaid
*Assistant Examiner*—Sindya Narayanaswamy
(74) *Attorney, Agent, or Firm*—Dennison, Schultz, Dougherty & MacDonald

(57) ABSTRACT

This invention relates to a multi-application processing process for a locatable active terminal (11), in which at least one link (A) is established with an identifiable program (10) dedicated to the execution of an application, said program imposing its operation conditions so that functions are made available. If necessary, the terminal has a punctual dialogue, via a (B) link, with the management center (12) for the implementation of capacity inputs and outputs of this latter, the management center then becoming slaved or not at the application level vis à vis the incoming program. The invention also relates to the program and terminal identification program during operation.

27 Claims, 2 Drawing Sheets

FIG. 1

METHOD AND DEVICES FOR MANAGING DATA TRANSFER

This invention relates to an information transfer management process and devices therefore.

RELATED ART

It will first be noted that the word <<program>> is used here to mean any type of digitally transmitted information, whether it be for example computer programs supplied over an Internet type of network, or cinema or television programs distributed via a cable or via terrestrial hertzian waves or via any other type of medium.

EP-A-0 778 512 describes a process enabling the provision, via a server to any a priori unauthorized third party, of a non executable version of a protected piece of software. After a possible authorization has been checked, a utility program which is also provided by the server, generates a version which is executable from the non executable version. This executable version only exists for the time necessary for its execution, and only in the volatile memory, such that the user cannot access it.

Yet, in this process as in any known process in connection with information transfer, programs and program drives, whether fixed or mobile, portable or not, are incapable of providing or managing identification or exploitation information in an interactive management way. For the content producer, this results in poorly traceable use of his productions when they are exploited.

Due to the multiplication of transmission means, along with the globalization of program providers, it is of importance to install within terminals, access principles the application processing capacity of which is more accurate, more secure and better adapted to the users' actual needs. Information service operators only have partial back access to the operations or applications which are not compatible with regard the medium, which is in contradiction with the information management techniques imposed by globalization. These clustering also effect in limiting access to programs and therefore in increasing their operation costs and amortization duration. Furthermore, pirate copies of some program elements on electronic medium for example cannot be efficiently traced back and controlled by eligible parties.

For example, in the television sector, whether it be pay-TV or not, there exists no a posteriori control means for program unit transactions. On the other hand, when transaction exchanges are activated, some confidential information is made available during the connection dialogue. Furthermore, it is impossible to allow program identification or to localize terminals, whatever the medium or information carrier used.

Current management systems are only partial systems which do not allow any hierarchised opening according to the related prerequisites, whether at the technical or legal level. Total traceability is unrealistic because neither the program nor the equipment are provided with an identifier and because the only available and prevailing access control with the terminal is an active or passive gate which operates with a simplified key. The use of terminals and the reading of the programs within geographical areas where the broadcaster has not acquired exploitation rights for the work is hence possible. This also represents an issue in the field of video program distribution, in which some legal obligations have to be met regarding the broadcasting chronology of the country where the work is exploited. For a program to be broadcast on a large scale, at the level of a continent or of the world, it should comprise its own identification information which should be managed by a locatable terminal in relation with an appropriate management center.

This invention aims at solving the above mentioned problems.

DESCRIPTION OF THE INVENTION

To achieve the above-mentioned goals, the invention is first related to a process for the management of information transfers from a transmission medium to a terminal drive, more specially a locatable drive, characterized in that it comprises the following steps:

provide customized encoding data to said terminal drive from a management center during an initialization procedure;

transmit encoded information on program reading authorizations from said management center to said terminal drive;

have said encoded information interpreted by said terminal drive by using said customized encoding data, when a program is presented to said terminal drive, carry out the terminal check to ensure that it is authorized to read the said program according to the interpreted information and to an identification code sent along with said program;

have the program read by said terminal drive if it is authorized to do so;

after the program has been read, provide information to said management center via said terminal on the carried out operations.

Encoding data which are shared by both the management center and the terminal drive are preferably personal and at least partially confidential for the user and are never fully exposed to the benefit of a third party. Part of these data at least are therefore supplied to the terminal before it is operated and apart from any open communication.

Transmissions between the terminal drive and the management center are usually carried out over a network the architecture of which can be exposed to any outside, hence non secure intervention.

Therefore, at least three security levels are provided.

Firstly, encoding data which are supplied to the terminal when it is initialized are known by the management center only. More particularly, they can take the terminal geographical location into account so that subsequently given authorization can depend on this location.

Furthermore, authorizations to read, which are usually transmitted on a punctual basis to the terminal over an open network, are themselves encoded and customized so that only one specific terminal can interpret them according to the encoding data it has been provided with.

Finally, each program is provided with an identifier which will allow a specific terminal to read it only if, on the one hand, the reading authorization has been provided by the management center and if, on the other hand, this authorization has been correctly interpreted by means of the encoding data.

Hence, the management center which has been informed, usually in a confidential manner, of the reading of a specific program will later be able to carry out invoicing and collection for the corresponding amount and then distribute the rights amongst the various eligible parties or concerned third parties. It should be noted that it is preferred that the terminal keeps record within its memory of the carried out actions so as to enable the on-site checking of the accuracy of the transactions.

Peripheral elements, whether fixed or mobile, can be served by the terminal's capacities with regards reading authorizations granted by eligible parties for this type of equipment.

The invention therefore enables electronic exchanges to be controlled, still maintaining the secrecy and anonymity character of the transaction, and this, whichever the medium used. The process according to the invention carries out a permanent management of data which are unknown to everybody but the management center so that the confidential information which is requested for the good operation are never available or exposed over the used communication media. Remaining information, which is exposed, then become unusable because it is only partial information and therefore inconsistent for any pirate. Any carried out transaction can therefore be authenticated by both the management center and the terminal.

The program contains identifying auxiliary equipment enabling services requested by the terminal user to be executed or not. The terminal matches its distribution capacities with the possible scenarios offered by the program and, if necessary, the access thereto which can be controlled by the management center. The terminal is provided with a secured memory the data processing capacities of which are for one part directly loaded during initialization so as to ensure matching with the management center. Should the management center receive an incoming order from the terminal, memory capacities downloading of this latter can be activated so as to receive the instructions which correspond to the request. The application capacities of the terminal and its memory allow information to be processed in an autonomous way and whichever the medium, without requiring any permanent link with the management center. For more specific applications a simplified direct interactive link can be requested from the management center by the terminal. In the case of applications requiring more important capacities, additional memories can be hosted by the terminal. The terminal can always be located by the management center which controls on request both the address of the terminal and the users' credit, and this in a totally confidential way when capacities are used. The terminal and the management center are provided with initial secret information which they manage alone, in accordance with the telephone and electronic coordinates of the terminal user.

This invention relates to a multi-application processing process for a locatable terminal, whether customized or not, in which at least one connection is established with an identified program dedicated to the execution of an application, said program imposing its technical or non technical operation conditions to the terminal so that functions are made available. If necessary, the terminal has a punctual dialogue with the management center via a low rate simplified link, for the implementation of capacity inputs and outputs of the latter, the management center becoming or not slaved to the terminal at the application level, vis à vis the incoming program. This invention also relates to the program and terminal identification process during operation.

The program presents an identification order to the terminal and then the terminal gets an application order to be executed according to this identification order. The terminal interprets the application orders with which it is punctually provided by the management center, carries out corresponding operations and acknowledges them. Should the program identification require an application response from the management center, the terminal sends an incoming order to the management center, said incoming order including the application response which acts as a query application order to be executed with the management center. The management center has a dialogue with the terminal so that its inputs and outputs are made available. If not, then the central unit of the terminal manages the programmed instructions in autonomy and memorizes the executed inputs and outputs in order to distribute them during a future query made by the management center or the user. These solutions are applicable, whichever the medium or program medium. They solve the problem linked to the clustering of the different information media.

The application field for such a process is very large as the terminal's operation capacities can be used for non identified programs, the application then being transparent, and also for identified programs aimed at being connected to a terminal which is remote or not from the information processing, fixed or mobile, portable or non portable, linked to the management center or not.

This invention also relates to the program identification process, a locatable terminal and a management center, whether they be fixed or mobile, portable or non portable, each comprising a central unit which is connected to various peripheral equipment such as a file, a keyboard, a modem, a DTMF transmitter, a Network Interface Module (NIM) and a monitor. Many management centers connected over the same network can process in synergy the applications concerning the terminals.

In case of duplication or broadcasting of a program by the terminal, the terminal can add to the data which has been copied or broadcast on the new medium, an identification code related to the addressing coordinates of the terminal. Hence, a new use of the copied program shall not only benefit the original eligible parties, but also the sender of the copy or of the broadcast, which will then be regarded as an intermediate distributor.

DETAILED DESCRIPTION OF THE INVENTION

Figure 1:
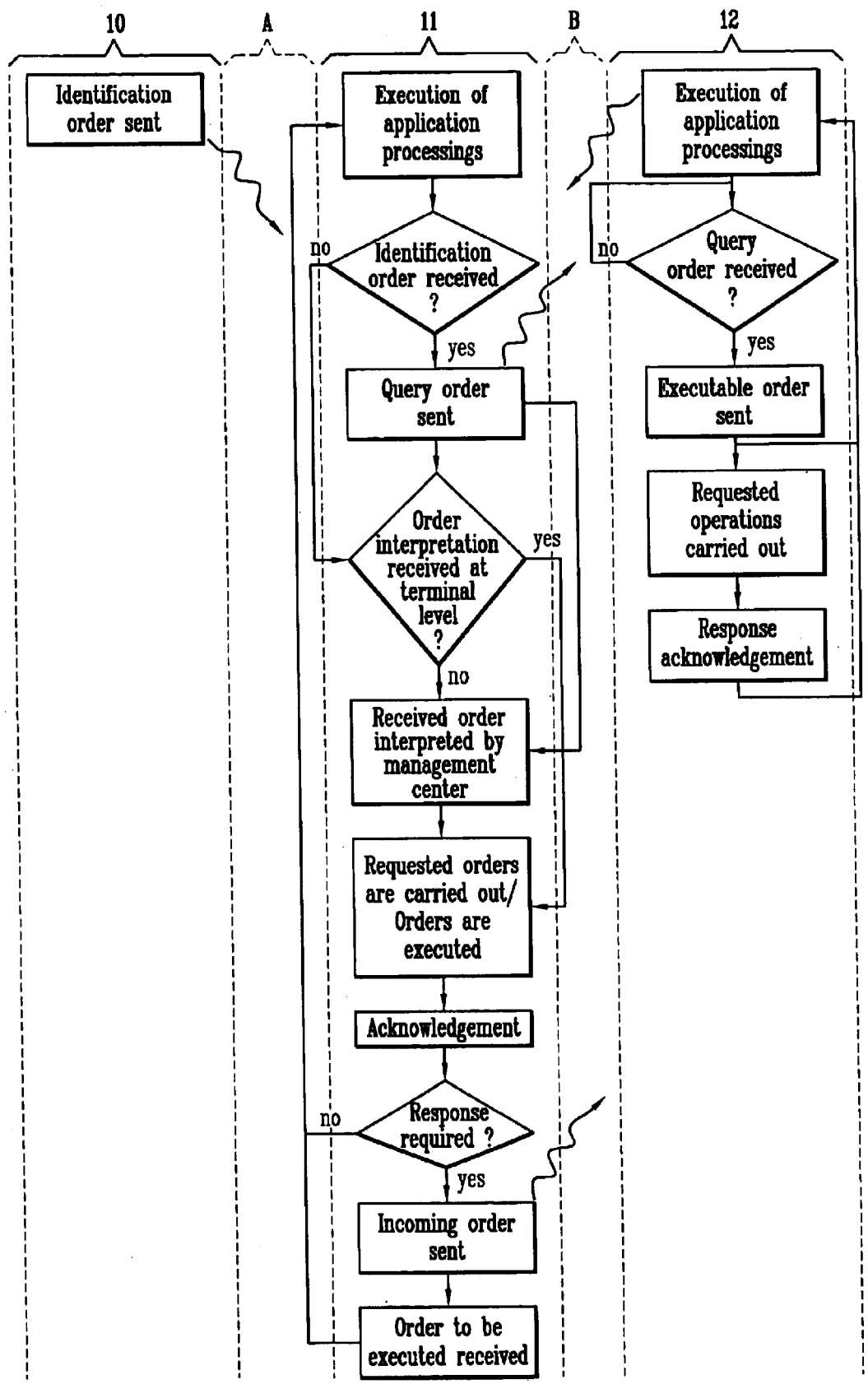
FIG. 1 is an illustration of an exchange session according to the invention.

The process according to the invention which is illustrated in FIG. 1 is a multi-application processing process for a locatable terminal (11), customized or not, in which at least one link (A) is carried out with an identifiable program (10) dedicated to the execution of an application, said program imposing its operation conditions, whether technical or not, to terminal (11) so that functions are made available. The terminal establishes a direct or punctual dialogue, using a simplified link (B), with the management center (12) for the implementation, if necessary, of the capacity inputs and outputs of this latter, the management center (12) becoming or not the slave of terminal (11) at the application level vis à vis the incoming program (10).

Figure 2:
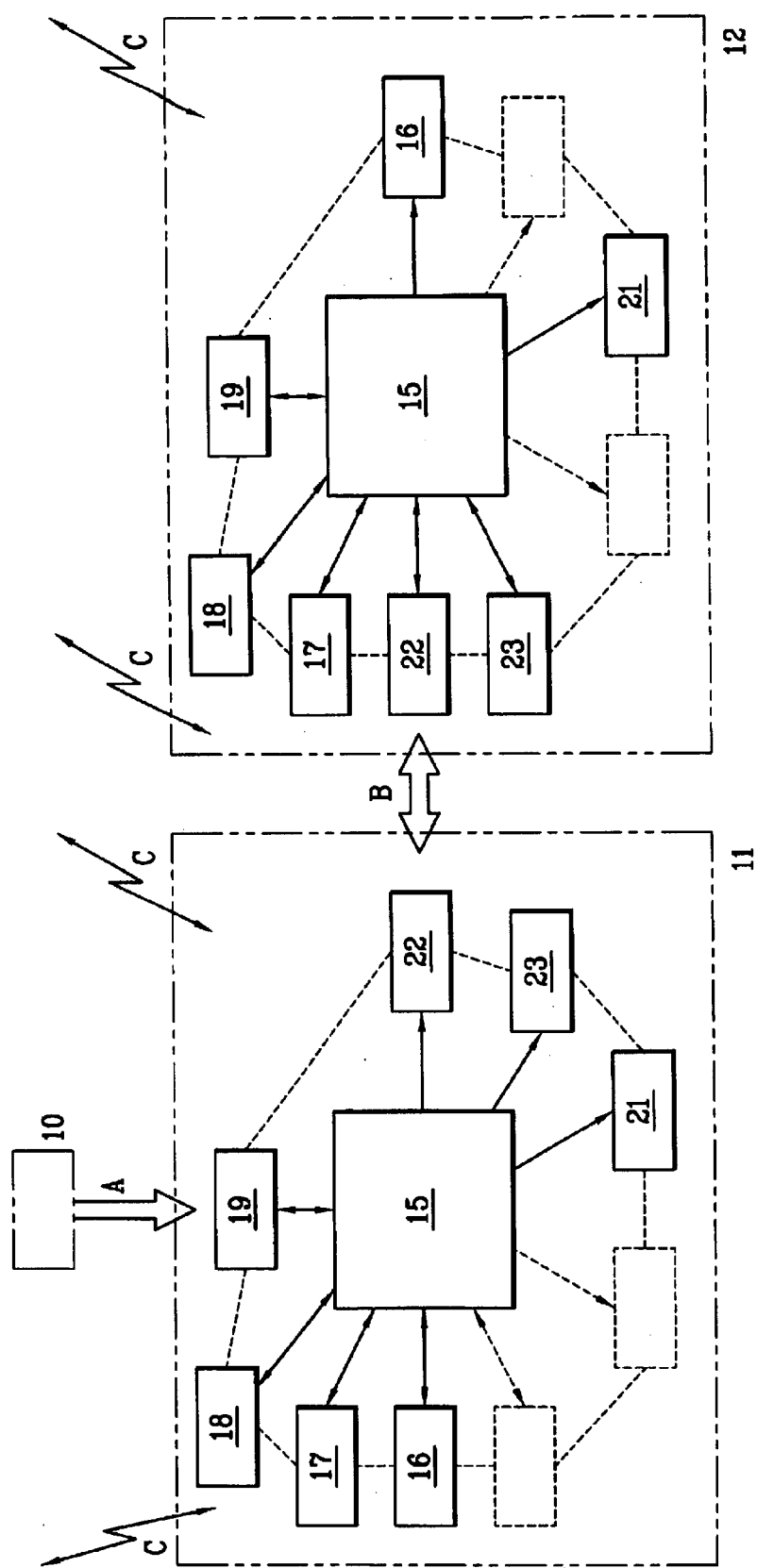
FIG. 2 illustrates a terminal linked to a management center and to an identifiable program.

FIG. 2 illustrates a terminal (11) according to the invention having a link (A) with a program (10), whether it be identifiable or not, and having a link (B) with the management center (12). Terminal (11) and management center (12) comprise a central unit (15) which is linked to various peripheral equipment such as, notably, a file (16), a keyboard (17), a modem (18) a DTMF multifrequency transmitter (19) enabling links (B) with the management center (12), a link (A) with program (10), a display device (21), a network interface module (NIM) (22), a monitor (23) and external links (C).

Program (10) sends an identification order to terminal (11) which authorizes the reading or not and if necessary, establishes a dialogue with the management center (12) regarding the availability of the capacity inputs and outputs of terminal (11). Some measures have to be taken such as defining identification as well as inputs and outputs orders, and standardizing these orders between terminal manufacturers and program producers. Should a service provider wish to build an application requiring security or not, it can elaborate and broadcast an identified or non identified program to its service or services. In such a configuration, as illustrated in FIG. 1, the terminal (11) becomes slaved, at the application level, vis a vis the program (10) with which the possible dialogue with terminal (11) and the management center (12) is carried out. When the program (10) is read by terminal (11), the application function to be carried out is detected by terminal (11). An incoming identification and query order is generated in the terminal so as to recuperate, thanks to two outgoing orders, an application order to be executed. Application orders have T (type), L (length) and V (value) formats. The extraction mechanism for the program (10) application is then initiated. Terminal (11) interprets application orders, carries out related operations and acknowledges them. Should the program identification order (10) require an application response from the management center (12), terminal (11) presents the management center (12) with an incoming order comprising the application response in the T, L, V formats and, after query to the management center and after the authorization has been received, it gets an authorization which acts as an application order for the authorization of the action to be executed. Otherwise, terminal (11) goes on requesting an application action which is to be carried out by means of a query application order related to the program identification. All identifiable actions are autonomously recorded and stored by terminal (11) so as to be available for a further information collection made by the management center (12). Both terminal (11) and management center (12) are provided with a memory and both comprise at least one microprocessor.

What follows is the description of an exchange session according to the invention.

Orders requested for the carrying out of the above described operations are as follows:

identification of program (10) by terminal (11) so as to enable query. This order triggers off the necessary acknowledgments at the level of terminal (11) and, if such is the case, an additional application query request within the management center (12). The identification order permits one to read the type (T) and length (L) of the application order to be carried out. It then has to be followed by the value (V) application reading order;

the application reading (V). This order completes the previous order. It permits one to collect the data associated to type (T) and value (V) which have been collected previously.

The values of the application writing, application reading (T, L) and application reading (V) orders have to be standardized between terminal manufacturers and application producers. Application orders and acknowledgments are linked to the exploitation of input and output resources of both the terminal and the management center, in relation with the program. They are under the TLV formats (Type, Length, Value) and can accept contents which will have to be defined according to the applications.

An application is a series of incoming and sometimes outgoing application orders. It can be noted that it always starts in a similar manner, thanks to an identification application order, and that it ends with an ending application order. The field of application for such a chain of orders is very large as it can be used for identified or non identified programs, in relation with localized or non localized, customized or not customized, portable or non portable terminals which can be connected or not to a fixed or mobile, portable or non portable information processing remote center.

As an illustration, we shall now analyze the case of an identified program read Is by a terminal and requiring an exploitation authorization from the management center. The presented case has been simplified on purpose so as to reduce the number of functionalities to be described.

The dialogue aiming at guiding the user is carried out orally. By using his keyboard, the user can send information to the voice server under a DTMF (Dual Tone Multifrequency) form. The program can send identification information which will be directly transmitted to the terminal. The terminal is capable of synchronizing an application with the management center which then becomes a server at the application level.

Description of the Service

A service provider operating in the field of television program distribution offers its loyal customers (those having credit in his books) the possibility to have its programs read by the terminal which operates in DTMF mode with his server. In order to certainly allocate the exploitation or reading cost for his program, he needs to identify his customers. In the same way, customers need to have a proof of their commitment. The service provider decides to grant them credit which is also an access code for the broadcast program, and which enables customers to carry out the necessary transactions. In order to carry out all these processings, the program has to be identified and the terminal has to be coupled to a management center.

Implementation

We assume that identification is carried out automatically within the terminal. The reader requests reading of the program via his terminal. The terminal identifies the program and compares it with its database so as to trigger off the availability process related to the management center. The program and the terminal pilot the operations schedule and access control is ensured by the management center which checks that the program can be distributed within the area where the terminal is operated and obviously, if the user's credit is sufficient for accessing the operation. Once authorizations have been sent, the program reading order is granted by the management center to the terminal. Transactions are recorded by both the management center and the terminal which are both provided with a secured and customized access protocol.

The subscriber, the management center and the program define a set of convolutive codes which the terminal only is capable of implementing, which increases immunity to piracy as activities develop and become diversified. The terminal central unit contains intelligence so as to manage protocols in a centralized way. The management center can punctually download information enabling an autonomous identification by the terminal thanks to a memory allocation which is dedicated to this application; this enables the clustering of applications according to a given geographical area, type of user or type of application.

In order to get a flexible and evolutive enough system, the digital cards which are used in relation with the central unit are mainly composed of programmable components and memories. The system controller collects the flow and writes it temporarily in a part of the external memory. It carries out the checking of data, the sorting out and synchronization of encoding data. The memory interface manages the interface and control of the external memory according to access requests from the various units. The initial signal is transposed during a preprocessing step so as to format incoming flow data; this only requires a few additional components.

For example, in the case of television broadcasting from the program to the terminal, as this type of application does not require a bidirectional module, the high rate downward signal only comprises a monodirectional part and the bidirectional upward part from the terminal to the management center and from the management center to the terminal can use a low rate signal (traditional switched telephone network). The subscriber gets connected to the rest of the world via one single network interface module (NIM) introduced for the return path so as to obtain an optimal performance/complexity ratio, and therefore the terminal can offer a combination of various functionalities and interoperabilities between the various networks.

The implementation of various different access protocols permitting one to support a large variety of services will be possible: video on request, remote teaching, telephone or data exchanges which are regarded as basic services, but also services such as opinion polls, games, telebuying, telemarketing, bank services, etc. The possibility to store, transmit, synchronize, multiplex, modify, scramble within an evolutive multiservice equipment will permit one to reduce the cost of all transactional operations. This new multimedia distribution concept can be adapted to any medium, and notably to cable and satellite applications, without substantially modifying the existing infrastructures.

Description of a Session

The identified program, which is dedicated to the terminal's application contains, along with identification data and its secret features, the triggering off of the application it launches in a synchronized way along with the associated terminal and management center (in fact it pilots all instructions from the management center on top of the terminal).

TLV orders necessary for such a session (the following list of possible orders is given as an indication only)

program introduction program identification by the terminal

DTMF transmission from the terminal to the management center acknowledgment (acknowledged status)

capture request capture end of session

The user operates his terminal and makes a program reading request

| Reading of program type | Program type |
| --- | --- |
| TL application reading | TL |
| V application reading | V |

The program makes its identification available to the terminal

| TLV application reading | |
| --- | --- |
| TL application reading | TL (request - capture [ciphered]) |
| V application reading | V (request - capture [ciphered]) |

The terminal receives the program and requests the user to enter his confidential code TLV application writing (capture) the terminal checks the confidential code. If correct then the session goes on.

TL application reading

TL (DTMF transmission)

V application reading

V (DTMF transmission)

The terminal gets the acceptance code from the management center which enables operations to be continued. It then goes on with the application

| TLV application writing (acknowledgment [status]) | |
| --- | --- |
| TL application reading | TL (capture request (enciphered) |
| V application reading | V (capture request (enciphered) |

The terminal requests program identification capture. Authentication is carried out by the terminal and echoes back to the management center

| TLV application reading (capture [capture result) | The result is stored in the memory of both the terminal and the management center |
| --- | --- |
| TL application reading | TL (capture request (enciphered) |
| V application reading | V (capture request (enciphered) |

The terminal and the management center request identification for the program the user is consulting.

TLV application writing (capture)

This result is stored in the smart card of both the terminal and the management center.

TL application reading

TL (request captured)

V application reading

V (request captured)

Request from the terminal and the management center to enter the amount of the transaction for the reading of the program.

| TLV application writing (capture [capture result]) | The result is stored by the terminal. Along with the management center, the terminal computes a certificate based on these three elements |
| --- | --- |
| TL application reading | TL (DTMF transmission [certificate, subscriber(s number]) |
| V application reading | V (DTMF transmission [certificate, subscriber's number]) |

The terminal gets the certificate and the subscriber's number which are present at the management center level. It thanks the customer. The transaction is over.

| TLV application reading (acknowledgment [status]) | |
| --- | --- |
| TL application reading | TL (end of session []) |
| V application reading | V (end of session []) |

The terminal waits for a new request from the user so as to launch a new application.

What is claimed is:

1. A method for the interactive management of digital rights during transfers of information by a transmission means to a terminal, comprising:

providing customized encoded data to said terminal from a management center during an initialisation procedure;

transmitting encoded information from said management center to said terminal;

interpreting said encoded information by said terminal using said customized encoded data;

checking if said terminal is authorized to read a program using said interpreted information and an identification code for said program when said program is presented to said terminal;

reading by said terminal said program if said terminal is authorized to read;

providing information to said management center from said terminal about the operations to be carried out after the program has been read; and, said terminal and said management center synchronizing together the reading of said program, wherein the terminal is being controlled by the management center.

2. A method according to claim 1, further comprising presenting an identification application order by said program to said terminal, said terminal providing an application order to be executed, and said terminal carrying out related operations and acknowledging the same.

3. A method according to claim 2, further comprising that should said application order require an application response from said management center, said terminal presents to the management center an incoming application order comprising the application response which acts as a query application order for a next application action to be executed.

4. A method according to claim 2, further comprising that should said application order require no application response from said management center, said terminal remains in a position permitting the action to be carried out by means of the program identification previously issued by the management center.

5. A method according to claim 1, further comprising establishing a first link by said management center with at least one terminal dedicated to the execution of an application.

6. A method according to claim 5, further comprising connecting a central processing unit of said management center to a plurality of peripheral devices.

7. A method according to claim 5, further comprising connecting a central processing unit of said management center to a file, a keyboard, a modem, a DTMF -Dual Tone Multifrequency transmitter, a monitor, a network interface module (NIM), a display device and external links (C).

8. A method according to claim 1, further comprising establishing a second link by said terminal with the program dedicated to the execution of an application.

9. A method according to claim 8, further comprising connecting a central processing unit of said terminal to a plurality of peripheral devices.

10. A method according to claim 8, further comprising connecting a central processing unit of said terminal to a file, a keyboard, a modem, a DTMF -Dual Tone Multifrequency transmitter, a monitor, a network interface module (NIM), a display device and external links (C).

11. A method according to claim 1, further comprising providing said terminal with a secured memory having data processing capacities, part of which are directly loaded during the initialization so as to ensure matching with said management center.

12. A method according to claim 1, further comprising providing said management center and said terminal with initial secret information manageable by either said terminal or said management center alone in accordance with telephone and electronic coordinates of a terminal user.

13. A method according to claim 1, further comprising providing customized encoding data having personal and confidential information of a user and providing said personal and confidential information to said terminal before it is operated and apart from any open communication.

14. A method according to claim 1, wherein the authorization to read is itself encoded and customized so that only a specific terminal can interpret them according to said customized encoded data.

15. A method according to claim 1, further comprising autonomously recording and storing all identifiable action by said terminal so that they are available for a further information collection made by said management center.

16. A method according to claim 1, further comprising providing a secured and customized access protocol to said management center and said terminal, and recording transactions by both said management center and said terminal.

17. A method according to claim 1, wherein said synchronizing of said terminal and said management center require said management center to become a server at application level.

18. A method according to claim 1, further comprising defining a set of convolutive codes by the subscriber, the management center and the program wherein the terminal only is capable of implementing thereby increasing immunity to piracy.

19. A method according to claim 1, further comprising establishing an intermittent dialogue by said terminal with said management center via a low rate simplified link to implement capacity inputs and outputs of the management center.

20. A method according to claim 19, further comprising interpreting the application orders provided intermittently by the management center and the terminal carrying out corresponding operations and acknowledging them.

21. A method according to claim 1, further comprising requesting a simplified direct interactive link by said terminal from said management center.

22. A method according to claim 1, further comprising presenting an identification order to the terminal wherein the terminal gets an application order to executed according to this identification order.

23. A method according to claim 1, further comprising serving fixed or mobile peripheral elements by said terminal with respect to reading authorizations granted.

24. A method for the interactive management of digital rights during transfers of information by a transmission means to a terminal, comprising:

providing customized encoded data to said terminal from a management center during an initialisation procedure; wherein said customized encoded data are known only by said management center;

transmitting encoded information from said management center to said terminal;

interpreting said encoded information by said terminal using said customized encoded data;

checking if said terminal is authorized to read a program using said interpreted information and an identification code for said program when said program is presented to said terminal;

reading by said terminal said program if said terminal is authorized to read;

providing information to said management center from said terminal about the operations to be carried out after the program has been read; and, said terminal and said management center synchronizing together the reading of said program, wherein the terminal is being controlled by the management center.

25. A method for the interactive management of digital rights during transfers of information by a transmission means to a terminal, comprising:

connecting a plurality of management centers to one another over a network;

providing customized encoded data to said terminal from said plurality of management centers during an initialisation procedure;

transmitting encoded information from said plurality of management centers to said terminal;

interpreting said encoded information by said terminal using said customized encoded data;

checking if said terminal is authorized to read a program using said interpreted information and an identification code for said program when said program is presented to said terminal;

reading by said terminal said program if said terminal is authorized to read;

providing information to said plurality of management centers from said terminal about the operations to be carried out after the program has been read;

said terminal and said plurality of management centers synchronizing together the reading of said program, wherein the terminal is being controlled by the plurality of management centers.

26. A method for the interactive management of digital rights during transfers of information by a transmission means to a terminal having a memory and a microprocessor, comprising:

providing customized encoding data to said terminal from a management center having a memory and a microprocessor during an initialisation procedure;

transmitting encoded information from said management center to said terminal;

interpreting said encoded information by said terminal using said customized encoded data;

checking if said terminal is authorized to read a program using said interpreted information and an identification code sent along with said program when said program is presented to said terminal;

reading by said terminal said program if said terminal is authorized to read;

providing information to said management center from said terminal about the operations to be carried out after the program has been read; and, said terminal and said management center synchronizing together the reading of said program, wherein the terminal is being controlled by the management center.

27. A method for the interactive management of digital rights during transfers of information by a transmission means to a terminal having a memory and a microprocessor, comprising:

providing customized encoding data to said terminal from a management center having a memory and a microprocessor during an initialisation procedure;

transmitting encoded information from said management center to said terminal;

interpreting said encoded information by said terminal using said customized encoded data;

checking if said terminal is authorized to read a program using said interpreted information and an identification code sent along with said program when said program is presented to said terminal;

reading by said terminal said program if said terminal is authorized to read;

providing information to said management center from said terminal about the operations to be carried out after the program has been read; and, said terminal being operable in an autonomous way to read said program without having a link to said management center.

* * * * *